July 4, 1933.   A. P. HARRISON   1,916,614
DEVICE AND METHOD FOR SUPPLYING FOAM SUPPRESSING SUBSTANCES
Filed July 2, 1930   2 Sheets-Sheet 1
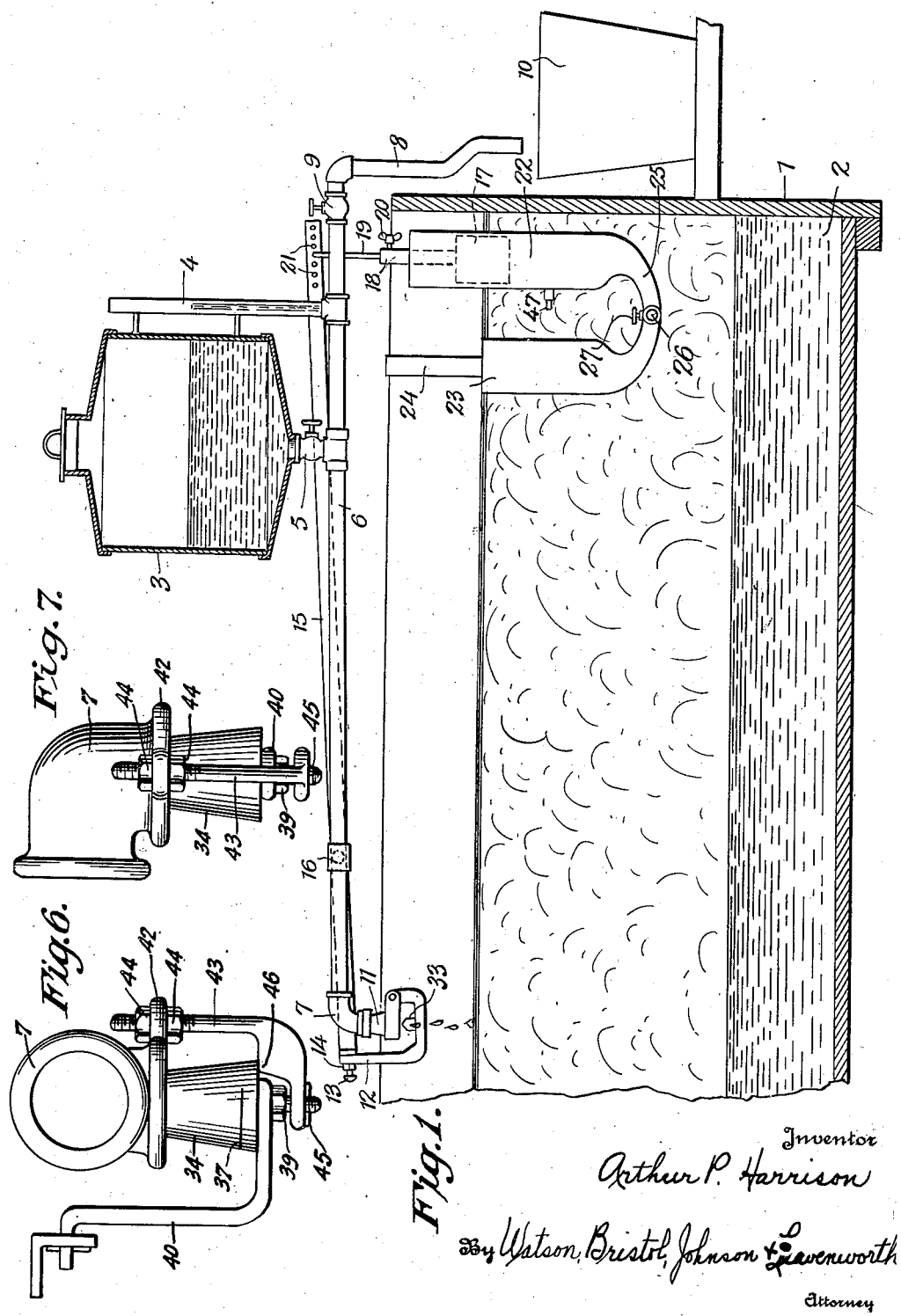

July 4, 1933.  A. P. HARRISON  1,916,614
DEVICE AND METHOD FOR SUPPLYING FOAM SUPPRESSING SUBSTANCES
Filed July 2, 1930    2 Sheets-Sheet 2
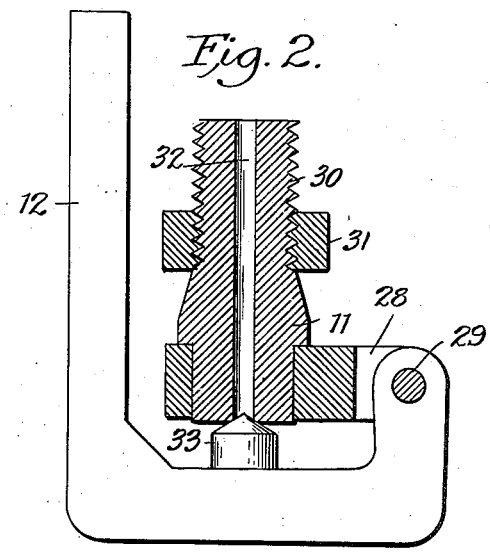
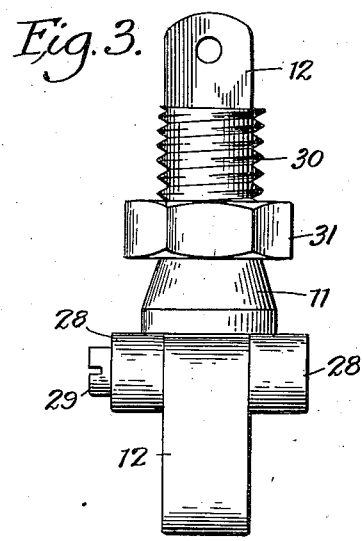
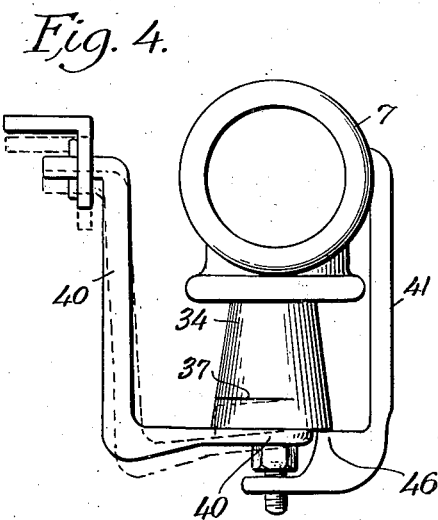
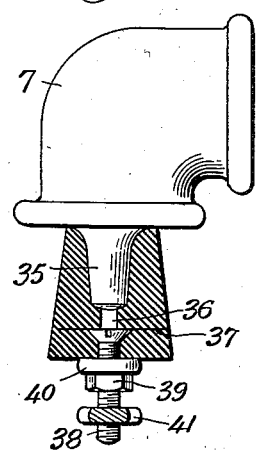
Inventor
Arthur P. Harrison
By Watson, Bristol, Johnson & Leavenworth
Attorney Patented July 4, 1933

1,916,614

UNITED STATES PATENT OFFICE

ARTHUR P. HARRISON, OF TAKOMA PARK, MARYLAND, ASSIGNOR TO STANDARD BRANDS INCORPORATED, OF NEW YORK, N. Y., A CORPORATION OF DELAWARE

DEVICE AND METHOD FOR SUPPLYING FOAM SUPPRESSING SUBSTANCES

Application filed July 2, 1930. Serial No. 465,432.

In general my invention relates to apparatus and methods depending on variations in the level of foam forming the superficial portion of the ebullient contents of a receptacle, for control of the supply of a substance in fluid condition which is fed to the container to suppress the foam.

Still more particularly my device in its specific described embodiment and in the form in which it has actually been constructed and used with marked success relates to a device for supplying substances such as oily or liquefied fatty compositions intermittently or continuously to the upper portion of a yeast propagation vat such as is customarily used in the propagation of bakers' yeast by the aeration method, this supply being automatically controlled so as to prevent any undue or excessive formation or accumulation of foam on the surface of the liquid contents in the yeast propagation vat (such propagation vats being commonly known as "fermenters").

The placement of an oily or fatty composition on the surface of a body of liquid such as yeast nutrient liquid in which bakers' yeast is being propagated by the aeration method for the purpose of suppressing foam formed and tending to form on the surface of the liquid is already a well known practice. However, it has been a general custom in actual practice to supply such compositions to the surface of liquids by merely casting portions of the oily or fatty composition on to the surface by hand according to the observations and judgement of an attendant who, generally with other duties, may have the duty of observing the formation of foam in yeast propagation vats under his care and of casting portions of the foam suppressing composition on the surface from time to time as in his observation seems to be required. Such practice as just mentioned, in nearly all instances at least, has involved the use of excessive quantities of the foam suppressing material over the quantities actually required for producing the desired results. Some attempts have heretofore been made to devise automatic apparatus intended to accomplish the same result, but so far as I am aware none of these particular forms of apparatus heretofore designed or attemptedly used have accomplished this result with entire success and satisfaction in usual commercial practice and it is an object of my invention (which object, from practical trial and use, I have found to be actually attained in commercial practice) to supply the foam suppressing substance when, and only when, actually required and in only such limited quantity as actually required, intermittently or continuously in accord with actual conditions governing the formation of foam and independently of the surging of the liquid due to aeration. In a process such as the commercial production of bakers' yeast by the aeration method the quantity of foam forming at different times during the period of yeast propagation varies considerably from time to time during the process and in the employment of an apparatus according to my invention as described and claimed in the present application foam suppression is automatically accomplished with great economy both as to the time and attention required by the attendant or attendants in charge of the process and as regards the quantity of foam suppressing material used for obtaining satisfactory foam suppression as compared with methods of supply and use of such materials as heretofore customarily practiced.

The various objects and advantages of my invention will in part be obvious and will in part be further set forth in connection with the following particular description of a specific preferred embodiment of the invention as shown by the accompanying drawings, in which:—

Figure 1 is a view partly in vertical cross section and partly in side elevation of a foam suppression device constructed in accord with my invention and shown as mounted for use in association with a vat such as a yeast propogation vat or commonly so called "fermenter".

Figs. 2 and 3 are, respectively, a side view (partly in cross section), and an end view, of a valve construction designed for and especially suitable for use with my foam suppression device.

Figs. 4 and 5 are views, respectively, in side elevation and an end view (partly in cross section) of another form of valve construction also especially designed and suitable for use as a part of the apparatus constituting my invention; and Figs. 6 and 7 are, respectively, side and end views in elevation of a modification of the form of valve and associated parts shown in Figs. 4 and 5.

As shown in the accompanying drawings and in the preferred embodiment of the invention, 1 represents an open vat, such for example as a "fermeter", as used in the propagation of yeast by the aeration process and which in actual practice may be of any suitable and desired dimensions and may have a height if desired considerably greater than its width (the drawings of course not being restrictively indicative of relative dimensions) and is shown as containing a body of liquid material 2 such for example as the liquid yeast nutrient material in which yeast may be propagated.

A receptacle 3 is adapted to contain a liquid or liquefied material such as an oily or fatty material, capable when introduced into the foam zone of the "fermenter" of causing the suppression or liquefaction in a large part at least of the foam present. A gage glass 4 is connected with and adapted to give visible indications of the liquid material in the receptacle 3. A manually controlled valve 5 may serve to cut off or limit the quantity of liquid flowing from the receptacle 3. A pipe 6 leads from the outlet valve 5 and may terminate in an elbow 7 adjacent the point of discharge of the foam suppressing liquid into the "fermenter".

An additional pipe connection 8 may lead from the outlet valve 5 and may be controlled by a separate valve 9 so that when and if desired liquid material from the receptacle 3 may be drawn off through the valves 5 and 9 and pipe 8 into a receptacle 10.

As shown in Figure 1, in order automatically to control the supply of liquid or liquefied material from the receptacle 3 to the foam zone within the vat or fermenter 1 a valve 11 is provided which within the general purview of my invention may be of any suitable construction but which for satisfactory operation with certain materials as hereinafter more particularly set forth must have certain characteristics not commonly possessed by the ordinary liquid flow control valves of commerce. This valve 11, whatever its particular type of construction may be, is controlled or actuated by a lever 12 suitably attached as by a bolt or machine screw 13 and nut 14 on the end of a lever 15 pivoted at a suitable and convenient point as on a bracket and pivot end 16 attached to the pipe 6 and at its other end the lever 15 is attached to a float 17, preferably by a telescoping and vertically adjustable rod formed in two parts 18 and 19 held together in desired adjustment by any suitable device such as a clamping screw 20. The upper portion of the rod 19 is attached at or near the end of the lever 15 remote from the valve 11, and for the purpose of providing an adjustable leverage provision may be made for the pivotal attachment of the rod 19 at different locations adjacent the end of the lever 15 as for example by providing a plurality of spaced holes 21 adjacent the end of the lever 15 within any one of which holes the end of the rod 19 may be suitably attached or pivoted as desired.

The float 17 is mounted within one arm of a U-shaped tube 22, this arm of the said U-shaped tube being preferably of greater height than the other arm 23, and the U-shaped tube as an entirety is suspended or mounted in any suitable and convenient manner and in a substantially stationary position, as by a bracket 24, in the upper portion of the vat or fermenter 1 and preferably at such a level that the top of the taller arm 22 of the U-shaped tube will be positioned above the level to which the foam will ordinarily rise in the vat or fermenter while the top of the shorter arm 23 will be at a level preferably at or below that to which it is regarded as permissible and satisfactory that foam may ordinarily rise.

The upper ends of the arms 22 and 23 of the U-shaped tube are preferably freely open and this U-shaped tube, or at least the main portion of its vertical arms, is preferably of sufficiently large diameter that either liquid or foam may flow with comparative freedom therewithin or therethrough. The lower curved portion 25 of the U-shaped tube is preferably provided with an opening 26 which may suitably be provided with a valve 27 which may serve the purpose of assisting in the equalization of the liquid and foam levels in the arms 22 and 23 with that exterior to these arms and also may be of utility in flushing out or cleansing the U-tube when desired, or in draining out excess accumulated liquid from the U-tube. The portion 25 is also constricted as shown, to an extent sufficient to prevent undue surging of the liquid therethrough, with consequent agitation of the float 17, but is of sufficiently large diameter to allow a free flow of liquid from one arm to the other. A desirable internal diameter for the constricted portion 25 is about ½ inch when the arms are about 3 inches or more in diameter, although it will be understood that the constriction may vary in accordance with the diameter and length of the tube used for forming the U-shaped member.

One suitable and desirable form of valve construction for use with and as a part of the apparatus of my invention is disclosed in Figs. 2 and 3 in which the valve casing 11 carries supporting arms 28 between which the lever 12 is suitably mounted as by a pivot 29. The valve casing 11 is preferably provided at its upper end with screw threads 30 for attachment to the elbow 7 and with a nut 31 for assisting in the proper and firm attachment between the valve and the elbow 7. An opening 32 extends longitudinally through the valve casing 11 and the edges of the lower end of this opening form a seat for the valve plug 33, the upper portion of which is preferably of tapered or conical form, this plug 33 being fixed to the lever 12 so that actuation of the latter as by the lever 15 serves to open or close the valve.

In a modified form of valve construction as shown in Figs. 4 and 5, the elbow 7 may have fitted to its outlet side a rubber stopper 34 suitably held within the outlet opening of the elbow 7 as by tight frictional engagement or by fitting the stopper onto a short extension pipe 35 attached to the elbow and in tight engagement within a perforation 36 extending longitudinally from the smaller end of the rubber stopper through its central portion for a part, suitably about two-thirds, of the length of the stopper.

From one side of the stopper 34, and at a distance which may suitably be about one-third of the length of the stopper from its larger end, a cross sectional incision or slit 37 is made in the stopper extending about two-thirds of the way through the width of the stopper and so that this incision or slit intersects and communicates with the opening 36 of the stopper. A device such as a bolt 38 extends through the head of the stopper and a nut 39 on this bolt serves to secure the end of a lever 40 in tight engagement with the head of the stopper. To assist in establishing a firm construction a brace or arm 41 may be attached to the elbow 7 at its upper end and may be suitably attached at its lower end to the lower portion of the bolt or screw 38. In Figs. 6 and 7 a slightly modified type of valve construction is shown differing from that shown in Figs. 4 and 5 in that a lug or extension arm 42 is brazed or otherwise firmly attached to one side of the flange at the outlet of the elbow 7, the bracing arm or support 43 preferably being threaded at its upper end which is passed through an opening in the arm or extension 42 and held firmly in engagement with the latter by nuts 44, one on each side of the arm 42, which in cooperation with a cotter pin 45 passing through the lower portion of the bolt or screw 38 serves to provide ready and convenient means for the removal and replacement of the stopper 34 and its associated and connected parts when desired and also, by the cooperation of the arm 43 through an opening in the lower end of which passes the bolt or screw 38 and of the cotter pin 45, serves to prevent the rubber stopper or its associated or connected parts or any of them from falling into the vat or fermenter in case some of these parts become loosened or disconnected from each other. The arm 41 or 43 with its portion 46 prevents dislodgement of the stopper 34 and undue movement of the lever 40.

As heretofore mentioned a valve controlling the supply of foam suppressing materials of certain characteristics as customarily used must meet special requirements which are not met by commercial valves of the type usually made for other general or special purposes. A valve for satisfactory control of the foam supression material in accord with the present invention must, for maximum efficiency, accuracy of dosage and economy of the foam supression material used, be of relatively great sensitivity, both as to the ease with which the valve may be opened and closed by relatively small force and also as regards the susceptibility of the valve to slight variations in the extent to which it is opened by slight variations in the degree of force applied to it, in order to maintain a proper and strict control over the flow of material and of the quantity flowing through the valve. Furthermore, some of the foam supression materials which are quite suitable for use and often may be used in commercial operations such as the suppression of foam in yeast propagation fermenters contain such quantities of constituents such as free acid as are likely to corrode materials such as are customarily used in the manufacture of ordinary valves. To avoid possible difficulties arising from such possible corrosion, I have found the particular valves shown in the accompanying drawings and described in connection therewith to be especially efficient and suitable for the intended purpose, both as to the durability, ease of operation and sensitivity of control of the quantity of liquid fed through the valve (which according to circumstances may vary from a mere intermittent drop by drop feed to a for the time being continuous feed of a steady stream of foam suppressing material of variable size).

In order to insure against difficulties otherwise possibly arising from corrosion as heretofore referred to, I have found it quite satisfactory to construct valves of the type shown in Figs. 2 and 3 of the drawings from hard rubber while, as heretofore mentioned, in constructing a special valve of the type shown in Figs. 4, 5, 6 and 7 a portion of the valve such as the slotted stopper 34 is preferably formed of soft flexible rubber which is both resistant to corrosion by acids and by reason of its flexibility permits the opening of the slotted portion of the stopper to either a very slight or to a greater degree by the action of the operating lever 40 accurately to control the supply of foam suppressing material. However, although I have found that hard vulcanized rubber and soft vulcanized rubber, respectively, are particularly satisfactory for these two special types of valve construction, it is within the purview of my invention to use any other materials resistant to corrosion by corrosive constituents possibly present in the foam suppressing material or, if a foam suppressing material is used which contains no corrosive substances, to use other or ordinary valve materials including such as might be susceptible of corrosion by acids. The sensitivity and satisfactory operation of my apparatus is facilitated by forming the valve operating parts of relatively light materials, and for this purpose the lever 15 may suitably be formed of aluminum or other relatively light but sufficiently rigid material and the other operative parts such as the float 17 and telescoping connecting rods 18 and 19 will be of suitably relatively light construction. Such other parts of the apparatus as come into contact with the foam suppressing material, including the receptacle 3, valve 5 (which of course is not required to possess or maintain a delicate sensitivity as is highly desirable in the valve 11), pipe 6, float 17 and rods 18 and 19 may be formed of any suitable material such as brass and the U-tube comprising the arms 22 and 23 and connection 25 may be formed of copper, these materials, in their respective locations and for their respective purposes, being ordinarily sufficiently resistant to the substances with which when used as described they will ordinarily come in contact. Except insofar as may be defined in the claims, the use of any particular materials in the construction of the apparatus and its different parts, as described, is to be regarded as preferential or merely exemplary and not as a limitation or essential feature of the invention in its general scope and broad aspect.

In the operation of the device as shown and described, the U-tube is first filled with liquid and, thereafter, foam rising on the surface of the material in the vat 1, on reaching the level of the top of the shorter open arm 23 of the U-tube will flow freely over the arm 23 and, by equalization of pressure between the arms 22 and 23 of the U-tube, will cause the float 17 and the end of the lever 15 to which the float is connected to rise, thereby depressing the opposite end of the lever 15 together with the attached lever 12 and serving to open the valve 11 to a greater or less degree depending upon the distance through which the float 17 is caused to rise. Foam suppressing liquid being thus admitted through the valve 11 into the contents of the vat 1, in proportionate quantity as required, will exert its effect upon the foam present in the upper portion of the vat, causing at least a partial suppression or coalescence of the foam into liquid form. When sufficient suppression of the foam has taken place the contents of the arms 22 and 23 of the U-tube will subside, thereby permitting the float 17 to fall and, according to the distance through which the float may fall, lessening the outflow of material through the valve 11 or stopping the outflow of material through the valve 11 entirely. By suitable placement of the apparatus in the upper portion of a vat or fermenter with respect to the level to which foam may rise and by a suitable adjustment of the different parts of the apparatus, as, for example, the proper regulation and adjustment of the opening 26 by the valve 27, and including the placement of the float 17 at the most suitable level, which may be accomplished by the adjustment afforded by the telescoping connecting rods 18 and 19, and by a proper and sufficient balancing of the operating arm 15 and its connected actuated and actuating parts, a great accuracy of adjustment of the apparatus may be readily obtained whereby the formation and accumulation of foam is automatically controlled within narrow limits. The use of foam suppressing material is conserved by the employment of only so much of this material as is actually necessary and by the use of any of it only when necessary for the purpose of foam suppression.

In the operation of a valve constructed as shown in Figs. 4, 5, 6 and 7, the depression of the lever 40 (which depression is accomplished in the same manner as that of the lever 12 in the valve construction as shown in Figs. 1, 2 and 3) serves to open the slot 37 (as is indicated by the dotted lines in Fig. 4) whereby foam suppressing material is permitted to flow through the slot 37 and into the vat or fermenter 1 for the purpose of foam suppression. A valve construction of this particular specific type has in actual practice been found to possess a very high and desirable degree of sensitivity and is very suitable for controlling the supply of foam suppressing material in instances where for a portion of the time at least a very small supply of foam suppressing material such as a drop by drop flow may be sufficient for control of foam formation.

It may be noted that in the usual manufacture of bakers' yeast by propagation of the yeast in a yeast nutrient material by the so-called aeration method a large quantity of air is customarily forced into the liquid in the vat or fermenter as through perforated pipes submerged in the liquid through which pipes the air is supplied under pressure, this type of construction for air supply being well known in the art and forming no part of the present invention and therefore not being shown in the drawings, and the passage of this air through the liquid (conjointly with the development of gas within the liquid as an incidental feature of the yeast propagation) may, and customarily does, cause a high degree of turbulence or surging of the liquid and overlying foam present in the vat or fermenter, and partly for this reason the mere placement of a float without any surrounding or shielding devices in the foam zone of a fermenter would not serve satisfactorily and efficiently for the proper control of a valve for supplying foam suppressing liquid in accord with the rise and fall of the float. In the preferred embodiment of my invention as shown and described the U-tube comprising the arms 22 and 23 serves to protect the float 17 from the influence of the turbulence or surging due to aeration or other causes operative within the zone of the vat or fermenter within which the float 17 is placed. As previously noted the arms 22 and 23 of the U-tube should be of sufficiently large size to permit suitable liquefaction of the foam and consequent suitable increase of pressure on the liquid in the arm 23 by the weight of the foam and coalesced liquid therefrom, and for this purpose in actual practice in yeast propagation by the aeration method with use of materials as customarily employed it has been found very satisfactory to use copper tubes of a diameter of 3 inches for the arms 22 and 23, although, of course, my invention is not at all limited or restricted to the use of tubes of this particular size.

A somewhat modified operation of the apparatus may be effected by providing the U-tube, at a suitable level, with a drainage opening (shown in Fig. 1 as being closed by a plug 47) of proper size (proportioned to the flow of liquid into and through the U-tube when the apparatus is in operation) whereby when the flow of liquid into the U-tube ceases or is at a lower rate than the drainage of liquid through the opening mentioned (which may be provided by removal of the plug 47 when desired) the liquid within the U-tube will fall to such an extent as to thereafter require a greater rise in order to elevate the float 17 than is required when no drainage is provided from the U-tube, thus giving the float a less frequent up and down movement and permitting somewhat greater variation in certain instances in the level of the foam.

If the level of liquid is sufficiently above the lower portion or bend of the U-tube it is also possible by opening the valve 27 to a suitable limited extent to permit a suitable partial drainage so that the liquid level in the U-tube may at times fall somewhat below the top of the arm 23 thereby producing a type of action of similar character as that which may be provided as just described by the utilization of a special drainage vent.

Since certain changes may be made in the above construction and different embodiments of the invention could be made without departing from the scope thereof, it is intened that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:—

1. In combination with a vat or fermenter adapted to contain a body of ebullient liquid on the surface of which foam is formed in a layer of variable thickness, means for starting, stopping and varying the rate of flow of a foam suppressing material to the said foam zone, means actuating the aforesaid means and itself actuated substantially solely by nonsurging variations in the level of foam in the said foam zone, and means to conduct generated foam to said actuating means to operate the latter and to shield it from turbulent movement and surges of the body of liquid and layer of foam.

2. In combination with a vat or fermenter adapted to contain a body of ebullient liquid on the surface of which foam is formed in a layer of variable thickness, a valve comprising surfaces of acid resisting material movable to and from contact with each other through a range within which is provided a continuous variability of valve opening between said surfaces, said valve being connected with a supply of foam suppressing material and positioned to discharge said material to the said foam zone, means actuating the aforesaid valve and itself actuated substantially solely by nonsurging variations in the level of foam in the said foam zone, and means to conduct generated foam to said actuating means to operate the latter and to shield it from turbulent movement and surges of the body of liquid and layer of foam.

3. In combination with a vat or fermenter adapted to contain a body of ebullient liquid on the surface of which foam is formed in a layer of variable thickness, a valve comprising surfaces of acid resisting material movable to and from contact with each other through a range within which is provided a continuous variability of valve opening between said surfaces, said valve being connected with a supply of foam suppressing material and positioned to discharge said material to the said foam zone, a float actuating the aforesaid valve, and means substantially shielding the float from the effect of turbulent movement of the body of liquid and layer of foam, whereby said float is actuated substantially solely by non-surging variations in the level of foam in the said foam zone.

4. In combination with a vat or fermenter adapted to contain a body of ebullient liquid on the surface of which foam is formed in a layer of variable thickness, means for automatically introducing a foam suppressing material to the foam zone at a rate directly proportional to the increase in thickness of foam and independently of the surging variations of the liquid and foam including actuating means shielded from turbulent movement and surges of the body of liquid and layer of foam.

5. The method of suppressing foam forming on the surface of a body of liquid in which yeast is being propagated by the aeration method, in which the foam at least periodically tends to increase in thickness, comprising automatically introducing a foam suppressing material to the foam zone at a rate directly proportional to the increase in thickness of foam and independently of the surging variations of the liquid and foam, said rate of introduction being controlled by generated foam substantially isolated from the body of the liquid and the layer of foam thereon.

6. In combination with a vat or fermenter adapted to contain a body of ebullient liquid on the surface of which foam is formed in a layer of variable thickness, a valve comprising surfaces movable to and from contact with each other through a range within which is provided a continuous variability of valve opening between said surfaces, said valve being connected with a supply of foam suppressing material and positioned to discharge said material to the said foam zone, a float for actuating the aforesaid valve and itself actuated substantially solely by variations in the level of foam in the said foam zone, a U-shaped member at the top of the vat having upwardly extending arms of different lengths in the longer arm of which said float rises and falls and a constricted portion at the base of said U-shaped member adapted to prevent surging of liquid from one arm thereof to the other, the shorter arm of said U-shaped member terminating at approximately the desired foam level and below the edge of the vat.

7. In combination with a vat or fermenter adapted to contain a body of ebullient liquid on the surface of which foam is formed in a layer of variable thickness, a U-shaped member at the top of the vat having upwardly extending arms of different lengths and a constricted portion at its base with an opening to allow the flow of liquid and foam therefrom, a float disposed and free to rise and fall in the longer of the said arms, a valve controlled by said float and comprising surfaces of acid resisting material movable to and from contact with each other as the float is lowered and raised, and a supply of foam suppressing material connected to said valve whereby said float may discharge into the vat a quantity of foam suppressing material proportional to the thickness of the foam generated, the shorter arm of said U-shaped member terminating at approximately the desired foam level and below the edge of the vat.

8. In combination with a vat or fermenter adapted to contain a body of ebullient liquid on the surface of which foam is formed in a layer of variable thickness, a U-shaped member at the top of the vat having upwardly extending arms of different lengths and a constricted portion at its base with an adjustable opening to control the flow of liquid and foam therefrom, a float disposed and free to rise and fall in the longer of the said arms, a valve controlled by said float and comprising surfaces of acid resisting material movable to and from contact with each other as the float is lowered and raised, and a supply of foam suppressing material connected to said valve whereby said float may discharge into the vat a quantity of foam suppressing material proportional to the thickness of the foam generated, the shorter arm of said U-shaped member terminating at approximately the desired foam level and below the edge of the vat.

9. In combination with a vat or fermenter adapted to contain a body of ebullient liquid on the surface of which foam is formed in a layer of variable thickness, a U-shaped member having upwardly extending arms of different lengths and a constricted portion at its base, a float disposed in and free to rise and fall in the longer of the said arms, a lever mounted on a fixed pivot and pivotally and adjustably connected to said float at one end, a valve controlled by said lever at its other end, and a supply of foam suppressing material connected to said valve, the shorter end of said U-shaped member terminating at approximately the desired foam level and below the edge of the vat, whereby said float may be raised by increase in the level of foam and independent of the surging of the liquid to open said valve and discharge a quantity of foam suppressing material therefrom into the vat proportional to the thickness of the foam generated.

In testimony whereof I affix my signature.

ARTHUR P. HARRISON.